United States Patent [19]
Smith

[11] Patent Number: 5,586,574
[45] Date of Patent: Dec. 24, 1996

[54] AIR SYSTEM CONTROL

[76] Inventor: Dean E. Smith, 14911 Forest Oaks Dr., Louisville, Ky. 40245

[21] Appl. No.: 205,071

[22] Filed: Mar. 3, 1994

[51] Int. Cl.$^6$ .............................. F16K 31/12; F04B 49/08
[52] U.S. Cl. .............................. 137/487.5; 417/5; 417/20; 417/28
[58] Field of Search .............................. 137/487.5; 417/5, 417/20, 28

[56]  References Cited

U.S. PATENT DOCUMENTS

| | | | |
|---|---|---|---|
| 4,371,315 | 2/1983 | Shikasho | 417/5 |
| 4,796,651 | 1/1989 | Ginn | 137/487.5 X |
| 4,816,987 | 3/1989 | Brooks | 137/487.5 X |
| 5,190,068 | 3/1993 | Philbin | 137/487.5 X |

*Primary Examiner*—John Rivell
*Attorney, Agent, or Firm*—Middleton & Reutlinger; David W. Carrithers

[57] ABSTRACT

Control system for maintaining selected pressure in a gas distribution system including a header and multiple takeoffs from the header including a compressor to supply gas to the header at selected pressure range, a control valve in the header upstream of the first takeoff, an actuator to operate the valve to modulate flow to the header, a pressure transducer to measure the pressure of the gas in the header between the valve and the first takeoff, a controller to receive a signal from the pressure transducer and generate a controller signal corresponding to a valve position required to maintain the flow of gas to the header to maintain the selected pressure and a position control device to receive the controller signal and an electronic position feedback signal from the actuator to indicate the position of the valve with a comparator to compare the valve position signal with the controller signal and an operator to operate the actuator to move the valve in a direction to the position where the position feedback signal corresponds to the controller signal.

4 Claims, 2 Drawing Sheets

AIR SYSTEM CONTROL

BACKGROUND OF THE INVENTION

Gas compressor distribution systems, particularly air compressor systems are used in a wide variety of applications to furnish compressed air to a distribution system composed of a header, sometimes including a storage reservoir, where there are multiple takeoffs from the header so compressed air is supplied to a variety of locations in a facility. In many applications the air used to operate numerous pieces of pneumatic machinery. It is a characteristic of most such machinery that the most efficient operation is achieved which the air is supplied at a uniform pressure. This is because the compressor operates in response to mass flow rate and not volume flow rate even though compressors are typically rated according to volume flow rate. If a large demand is created, for example by opening a relatively large outlet, without control, the compressor discharge pressure increases to accommodate the increased flow and particularly inefficient operation results because the compressor is required to supply air at higher pressure so the mass flow rate is greatly increased. On the other hand if the supply pressure is controlled before the discharge, then the compressor generates air at a lower mass flow rate but still is able to accommodate the consumption needs but the energy requirements are substantially reduced because of the lower mass flow rate.

Accordingly it is important to control the pressure of the air supply to the header as closely as possible to provide air to the takeoffs at optimum pressure and minimum mass flow rate.

Many air supply systems are equipped with a multiplicity of compressors where the compressors are cycled on and off as needed to maintain the required air flow at the required pressure.

While such systems can operate satisfactorily but no prior art system is known to anticipate the relative capacity left in the operating compressor so the supplemental compressors do not come on line until a time after the operating compressors have been fully extended so there is a period of lower than desired line pressure. As a result, many facilities operate the auxilary compressor continuously even though it is unloaded to avoid the problem. This of course significantly increases the energy consumption of the system.

While it is possible to maintain excess pressure from the compressor to the header considerable difficulty has been experienced in finding the means to effectively reduce the pressure to the desired supply pressure and maintain the desired pressure to the distribution system over a wide range of demand rates.

Another problem encountered with systems operating pneumatic equipment is that even momentary interruption of the required air pressure can lead to the production of defective or off specification product and other equally undesirable problems.

Additionally, the cost of energy required to operate compressors to supply compressed air continually increases so that it is necessary to conserve air and operate air supply systems at optimum efficiency to maintain control of cost in many applications.

Method and apparatus for dealing with problems associated with maintenance of air pressure in distribution systems has been encountered in the prior art.

In one method pressure regulating valves are used which measure the air pressure in the header and through a series of mechanical devices such as diaphragms and springs operate a valve to attempt to adjust the pressure in the header. Such methods have proven ineffective for several reasons including the simple fact that the mechanical feedback system is incapable of responding quickly and accurately to pressure change, particularly where pressure may change rapidly and frequently as normally encountered in air systems operating pneumatic equipment. Additionally, such systems have not been capable of providing the air flow rates frequently required in operation of air distribution systems.

A similar problem in encountered in systems where a control valve is provided in the header upstream of the first takeoff with an actuator to operate the valve to modulate flow to the header, a pressure transducer to measure the pressure of the gas in the header between the valve and the first takeoff and a controller to receive a signal from the pressure transducer and generate a controller signal corresponding to a valve position required to maintain the flow of gas to the header to maintain the selected pressure where a position control device is provided to receive the controller signal and generate a pneumatic control signal in response to the controller signal and a mechanically generated position feedback signal from the actuator where the pneumatic control signal is supplied to an operator to operate the actuator to move the valve in a corrective direction. Because of the mechanical linkages and the pneumatic signals required such systems and apparatus have generally proved ineffective and insufficiently responsive to changes in demand to effectively control pressure in the distribution system.

Another prior art arrangement for accomplishing the objective of controlling air distribution systems is provided by "Conservair Technologies" of Kenosha, Wis. which provides two or more air circuits operating in parallel flow where "ON-OFF" valves are provided in each circuit. The valves are cycled between on and off as needed to attempt to maintain air pressure as needed in the header. In many cases several control locations may be required and the ability of the system to maintain pressure is limited by the flow characteristics of each of the parallel control circuits.

In general, no prior art arrangement or method is known which provides the effectiveness, responsiveness and advantages of devices within the scope of the present invention.

SUMMARY OF THE INVENTION

The present invention provides new, useful and highly effective apparatus for the control of air pressure in air distribution systems and further effectively facilitates balancing such systems to significantly enhance operation efficiency to lower operating and supply cost.

Devices within the scope of the present replace prior art mechanical devices with fast efficient electronic devices to greatly increase system responsiveness at low cost.

Further, apparatus within the scope of the present invention has the capability to provide control characteristics unavailable with prior art devices.

Briefly, control arrangements within the scope of the present invention recognize the need to operate compressor/air distribution systems at specific pressure ratios to reduce mass flow demands on compressors and achieve levels of efficiency unavailable with prior art control devices.

Additionally, devices within the scope of the present invention have the capability to operate multiple compressor systems and anticipate when an operating compressor is reaching its capacity and then commence operation of a backup compressor to prevent "sags" in available air pressure but still achieve the operating efficiencies available with multiple compressor systems.

Briefly the present invention provides control systems for maintaining selected pressure in a gas distribution system including a header and multiple takeoffs from the header including a compressor to supply gas to the header at selected pressure range, a control valve in the header upstream of the first takeoff, an actuator to operate the valve to modulate flow to the header, a pressure transducer to measure the pressure of the gas in the header between the valve and the first takeoff, a controller to receive a signal from the pressure transducer and generate a controller signal corresponding to a valve position required to maintain the flow of gas to the header to maintain the selected pressure and a position control device to receive the controller signal and an electronic position feedback signal from the actuator to indicate the position of the valve with a comparator to compare the valve position signal with the controller signal and an operator to operate the actuator to move the valve in a direction to the position where the position feedback signal corresponds to the controller signal.

Examples of arrangements within the scope of the present invention are illustrated in the accompanying drawings and described hereinafter but it will be understood that neither the illustrations nor the descriptions thereof are by way of limitation and that other arrangements also within the scope of the present invention will occur to those skilled in the art upon reading the disclosure set forth hereinafter.

BRIEF DESCRIPTION OF THE DRAWINGS

Examples of arrangements within the scope of the present invention are illustrated in the accompanying drawings wherein.

DETAILED DESCRIPTION OF THE DRAWINGS

Figure 1:
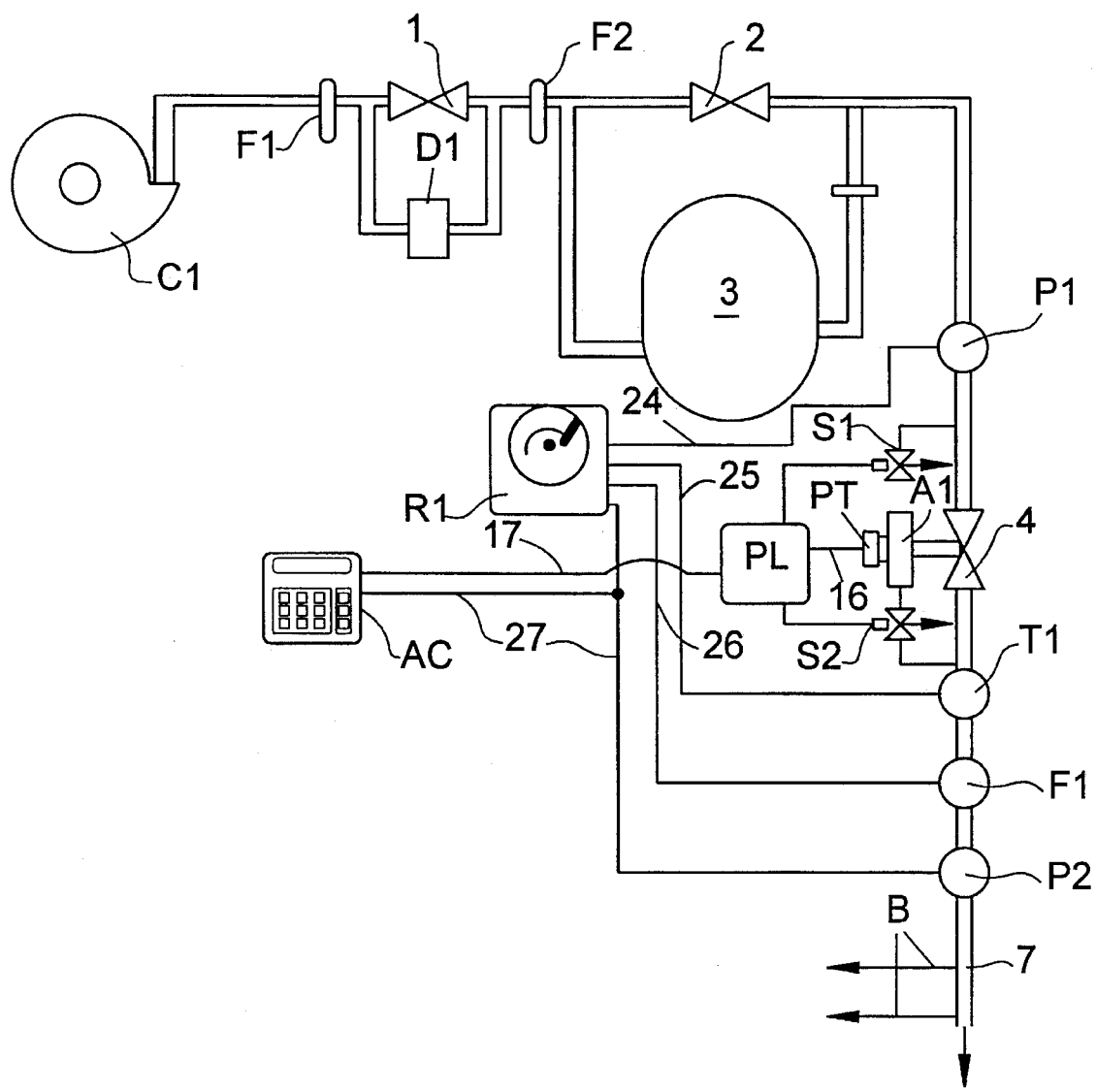
FIG. 1 is a schematic illustration of one example of an air distribution control system within the scope of the present invention.

FIG. 1 illustrates an air supply system which includes a compressor C1 which supplies air to a header 7 and distribution outlets 8.

As shown the system includes filters F1 and F2 as well as an air drier D1 with a drier bypass valve 1 as is known in the art.

A system storage tank 3 can be provided to level out supply and demand to some extent as is also known in the art. A storage by-pass valve 2 can be provided for use if it is not required to use the storage facility.

A supply pressure transducer P1 is provided to measure the pressure available at the discharge of the storage tank and supply a signal 24 to a multiport recorder R1.

A control valve 4 is provided to adjust the pressure in the header and is operated in modulated mode by means of an actuator A1 which can be operated by solenoid valves S1, S2 as described hereinafter to position the valve 4 to control the pressure in header 7. It has been found particularly advantageous to use systems where the actuator is operated by solenoid valves rather than electropnuematic or pneumatic positioners as known in the art because such devices do not provide the responsiveness or repeatability required for applications of the present invention, The positioner system shown includes an electronic position feedback transmitter PT which generates an electronic signal 16 indicating the position of the valve to a logic module PL which receives the position feedback signal and a controller signal 17 from a process controller AC where the signal 17 indicates a position determined by the controller to be required to maintain the desired pressure in header 7. The controller signal and the position feedback signal are compared in the logic module PL and the logic module operates the solenoid valves S1 and S2 to move the actuator A1 in a corrective direction to position the valve at the position corresponding to the control signal 17.

As shown the temperature of the air can be measured by a transducer T1 and a signal 26 supplied to the recorder R1. Likewise a flow measuring device F1 as known in the art can be provided to compute air flow through header 7 and generate a signal 26 also supplied to recorder R1, It will be noted that the flow measuring device is located after the pressure adjusting control valve 4 so that accurate flow rates can be obtained.

Finally, a header pressure transducer P2 is provided to measure the air pressure in header 7 and generates signal 27 which is supplied to both recorder R1 and controller AC which generates the controller signal 17 to operate valve 4 to maintain the pressure.

While any type of electronic positioning device utilizing solenoid valves can be utilized to position the actuator A1 digital positioning systems of het type manufactured by KyTronics Inc. of Louisville, Ky. have proved to be particularly effective.

In operation the pressure in header 7 is determined by transducer P2 and generates signal 27 supplied to controller AC which in turn generates controller signal 17 supplied to logic module PL to operate solenoids S1 and S2.

Figure 2:
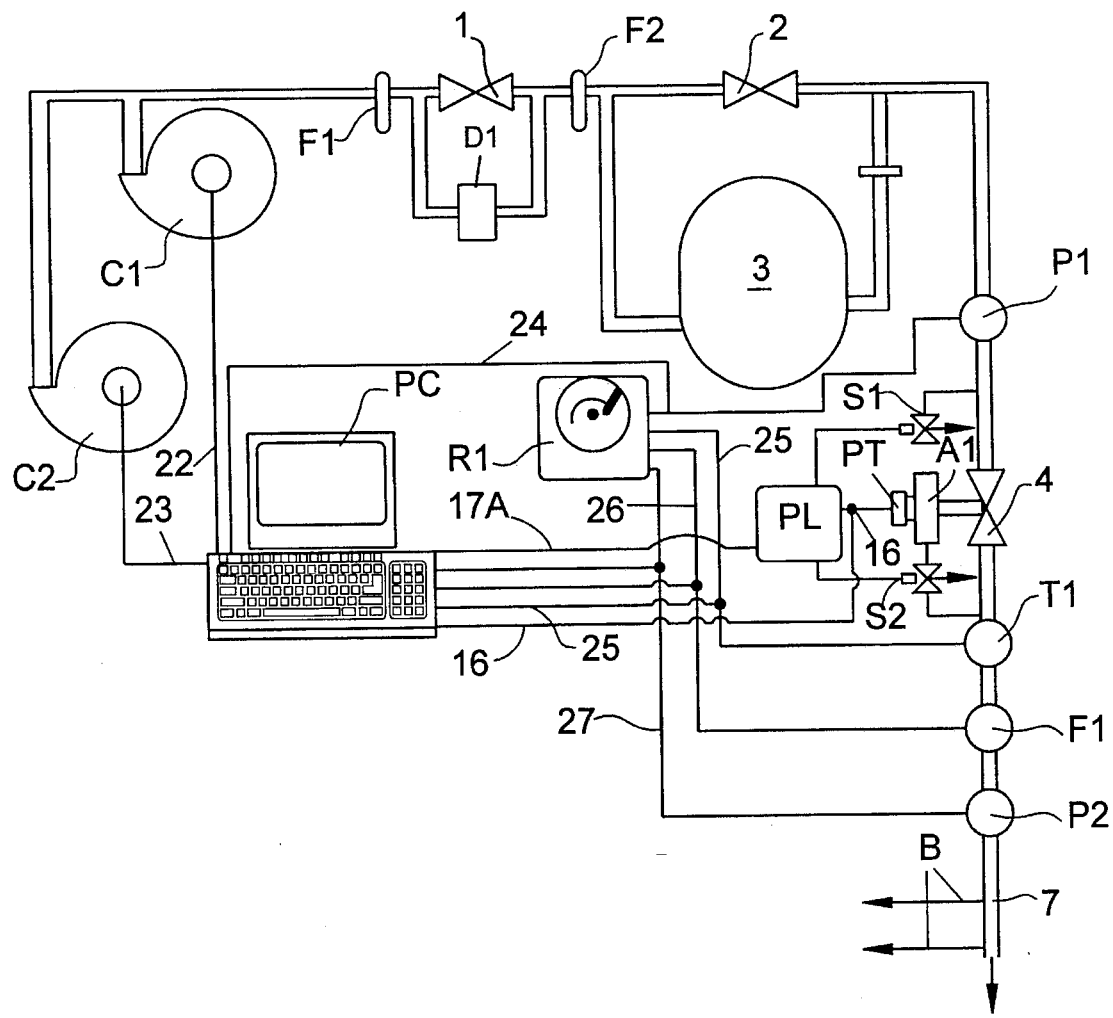
FIG. 2 is a schematic diagram of another arrangement within the scope of the present invention.

FIG. 2 illustrates an air supply system similar to that shown in FIG. 1 but includes multiple compressors C1, C2 which supply air to a header 7 and distribution outlets 8. Systems of the type shown in FIG. 2 would typically be used in large demand systems where supply fluctuations would require cycling compressors in response to changing demand rates As shown the system, like that shown in FIG. 1, includes filters F1 and F2 as well as an air drier D1 with a drier bypass valve 1 as is known in the art.

A system storage tank 3 can be provided to level out supply and demand to some extent as is also known in the art. A storage by-pass valve 2 can be provided for use if it is not required to use the storage facility.

As in FIG. 1 a supply pressure transducer P1 is provided to measure the pressure available at the discharge of the storage tank and supply a signal 24 to a multiport recorder R1.

A control valve 4 as shown in FIG. 1 is provided to adjust the pressure in the header and is operated in modulated mode by means of an actuator A1 which can be operated by solenoid valves S1, S2 as previously described to position the valve 4 to control the pressure in header 7.

As shown in FIG. 1 the positioner system shown includes an electronic position feedback transmitter PT which generates an electronic signal 16 which can be in digital format indicating the position of the valve to a logic module PL which receives the position feedback signal and a controller signal 17A from a process controller PC where the signal 17A indicates a position determined by the controller to be required to maintain the desired pressure in header 7. The process controller shown in FIG. 2 can advantageously be a digital process controller such as a programmable logic controller PLC and can generate and receive digital signals.

In the application shown the controller signal and the position feedback signal can both be digital and are compared in the logic module PL and the logic module operates the solenoid valves S1 and S2 to move the actuator A1 in a corrective direction to position the valve at the position corresponding to the control signal 17A.

The arrangement shown in FIG. 2, as shown, provides for measurement of the temperature of the air by a by transducer T1 to supply a signal 25 to the recorder R1 and in this case to controller PC. Likewise a flow measuring device F1 as known and described with reference to FIG. 1 can be provided to compute air flow through header 7 and generate a signal 26 also supplied to recorder R1 and to controller PC.

Finally, header pressure transducer P2 measures the air pressure in header 7 and generates signal 27 which is supplied to both recorder R1 and controller PC which generates the controller signal 17 to operate valve 4 to maintain the pressure.

In operation as described with reference to FIG. 1 the pressure in header 7 is determined by transducer P2 and generates signal 27 supplied to controller AC which in turn generates controller signal 17A supplied to logic module PL to operate solenoids S1 and S2.

However in the case of the apparatus shown in FIG. 2, Process controller PC has additional capabilities and can monitor header pressure as well as supply pressure determined by transducer P1 and/or flow determined by transducer F1 to operate either, both or neither of the compressors C1 and C2 as required.

It is in this aspect that the arrangement shown in FIG. 2 can anticipate the need for operation of the second compressor. That is the controller can monitor the supply pressure sensed by transducer P1, the header pressure sensed by transducer P2 and the position of the valve so that if the pressure in the header and the pressure in the header are approaching each other and the valve is open more than a predetermined position the approach of the limit of capacity of the compressor is indicated and a operation of a second compressor can be initiated.

In this way the control system provided by the present invention can anticipate the need for operation of an auxilary compressor and initiate operation before the operating compressor reaches its capacity and the pressure in the header "sags" before and during startup of the auxilary compressor. Additionally, since it is not necessary to operate the backup compressor continually significant energy savings are realized.

It will be understood that the foregoing are but a few examples of arrangements within the scope of the present invention and that other arrangements also within the scope of the present invention will occur to those skilled in the art upon reading the disclosure set forth hereinbefore.

The invention claimed is:

1. Control system for maintaining selected pressure in a gas distribution system including; a header means with multiple takeoffs from the header; compressor means to supply gas to the header at selected pressure range: control valve in the header upstream of the first takeoff: actuator means to operate the valve to modulate flow to the header, pressure transducer means to measure the pressure of the gas in the header between the valve and the first takeoff, controller means to receive a signal from the pressure transducer and generate a controller signal corresponding to a valve position required to maintain the flow of gas to the header to maintain the selected pressure and a position control means to receive the controller signal and an electronic position feedback signal from the actuator to indicate the position of the valve; comparator means to compare the valve position signal with the controller signal; operator means to operate the actuator to move the valve in a direction to the position where the position feedback signal corresponds to the controller signal.

2. Control system for maintaining selected pressure in a gas distribution system including; a header means with multiple takeoffs from the header; first and second compressor means to supply gas to the header at selected pressure range: control valve in the header upstream of the first takeoff: actuator means to operate the valve to modulate flow to the header, first pressure transducer means to measure the pressure of the gas in the header between the valve and the first takeoff; second transducer means to measure the gas pressure between the compressor means and the valve; controller means to receive signal from said first and second pressure transducer means and generate a controller signal corresponding to a valve position required to maintain the flow of gas to the header to maintain the selected pressure and a position control means to receive the controller signal and an electronic position feedback signal from the actuator to indicate the position of the valve; comparator means to compare the valve position signal with the controller signal; operator means to operate the actuator to move the valve in a direction to the position where the position feedback signal corresponds to the controller signal.

3. The invention of claim 2 wherein said controller receives said position feedback signal and operates said second compressor in response to selected relationship among said first transducer signal, said second transducer signal and said position feedback signal.

4. The invention of claim 3 wherein said controller operates in digital format.

* * * * *